Figure 1:
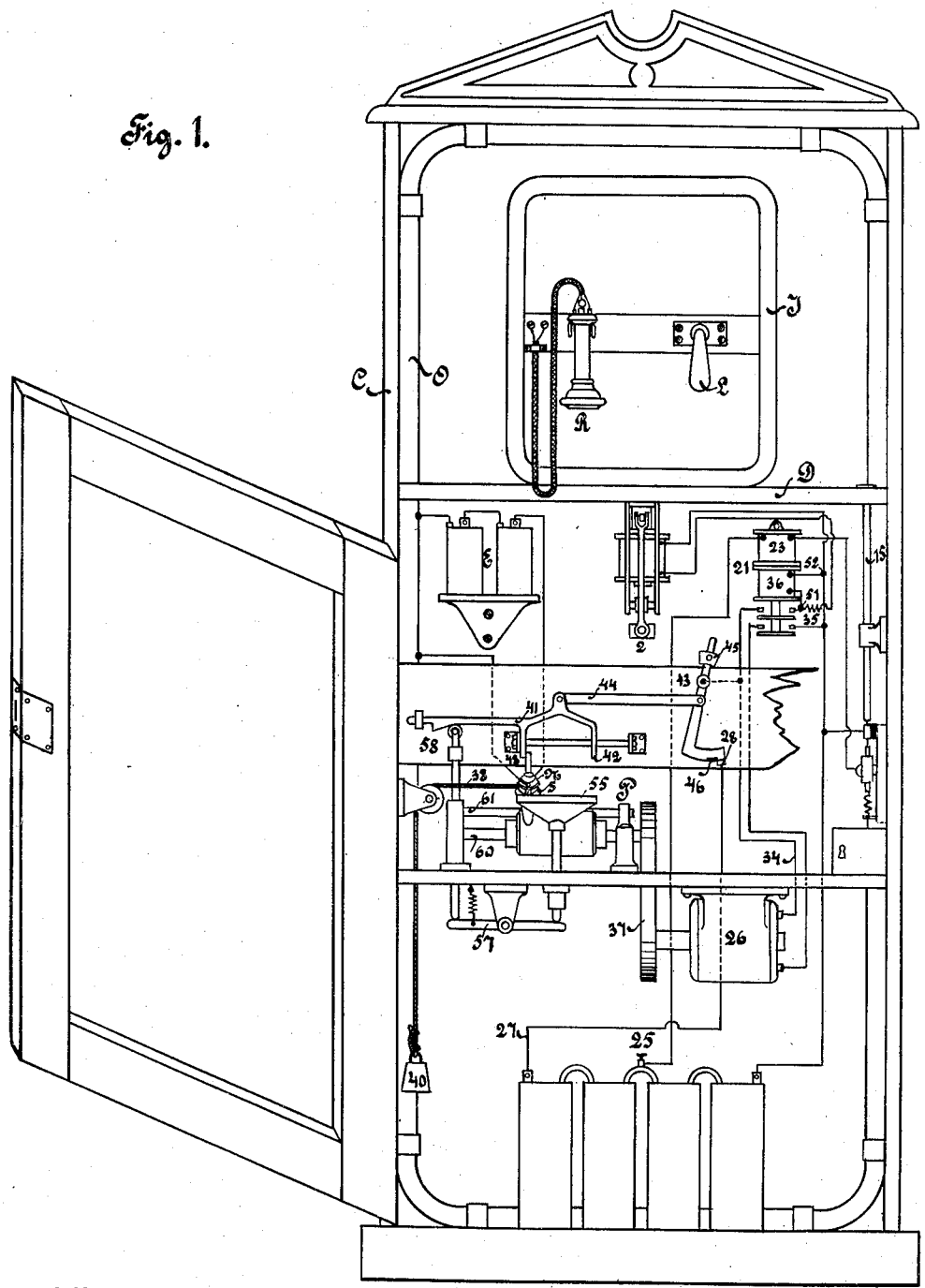

A. F. COLLINS.
PHONOGRAPHIC WIRELESS TELEPHONE.
APPLICATION FILED MAR. 18, 1909.

1,050,777.

Patented Jan. 14, 1913.

5 SHEETS—SHEET 1.

Witnesses.
A. Løwenhjelm Kopp
Frederick A. Watkins

Inventor.
Archie Fredrick Collins

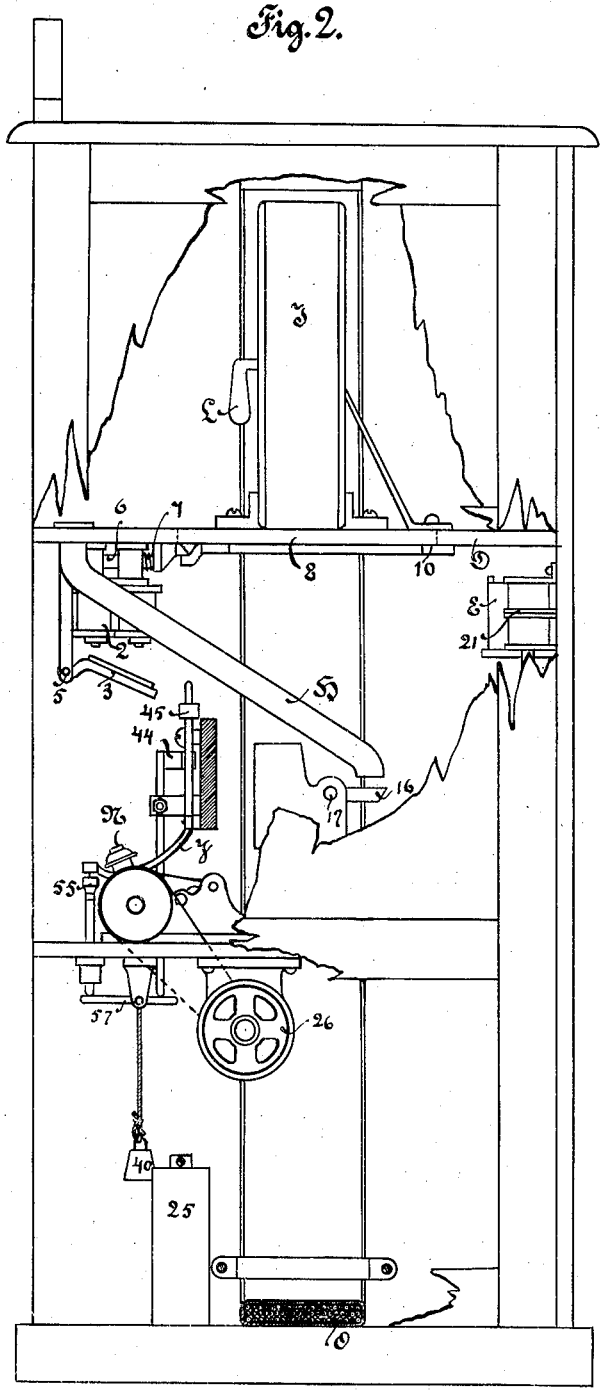

A. F. COLLINS.
PHONOGRAPHIC WIRELESS TELEPHONE.
APPLICATION FILED MAR. 18, 1909.
1,050,777.
Patented Jan. 14, 1913.
5 SHEETS—SHEET 3.
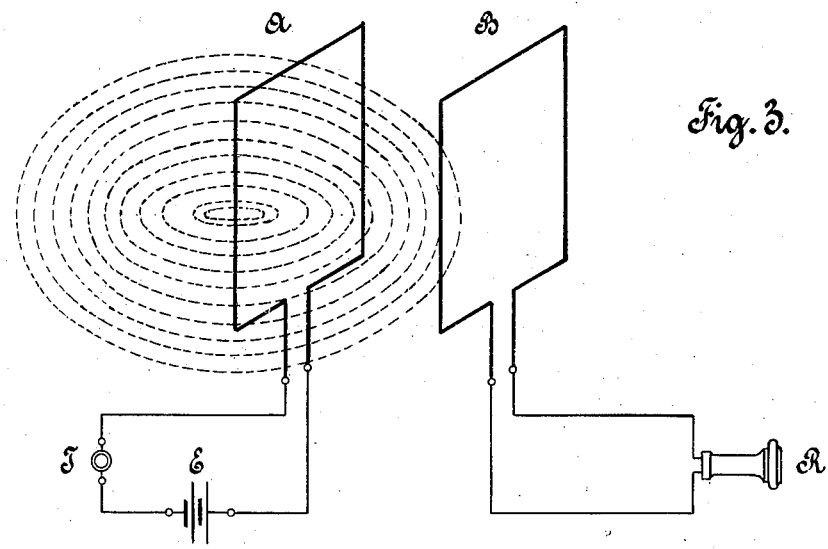
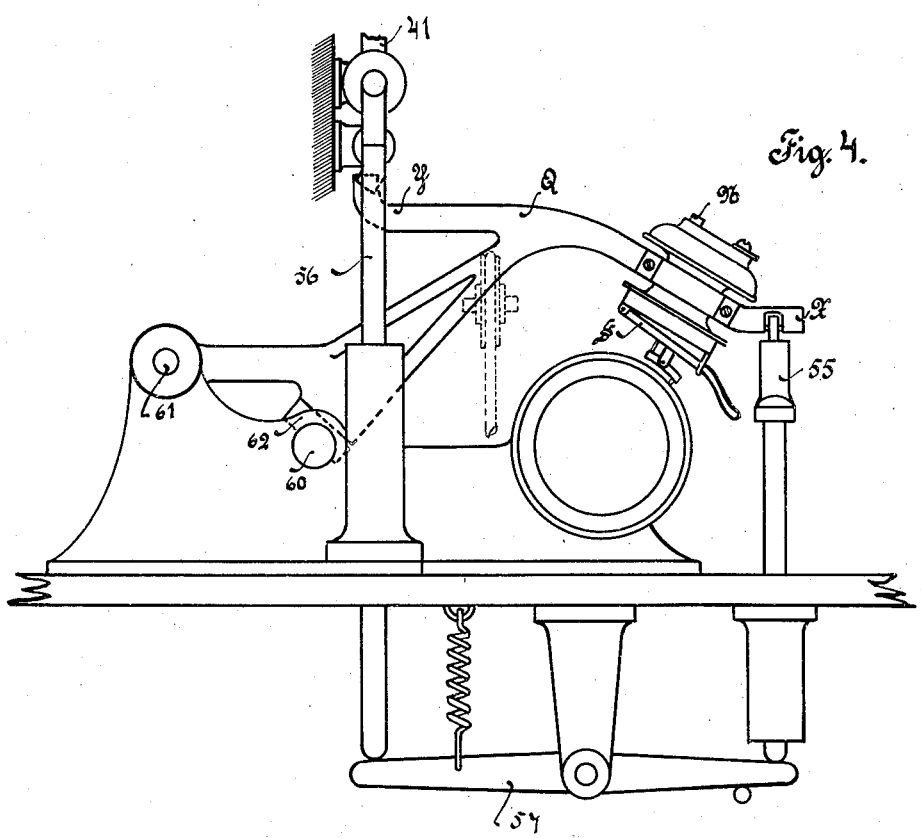

A. F. COLLINS.
PHONOGRAPHIC WIRELESS TELEPHONE.
APPLICATION FILED MAR. 18, 1909.
1,050,777.
Patented Jan. 14, 1913.
5 SHEETS—SHEET 4.
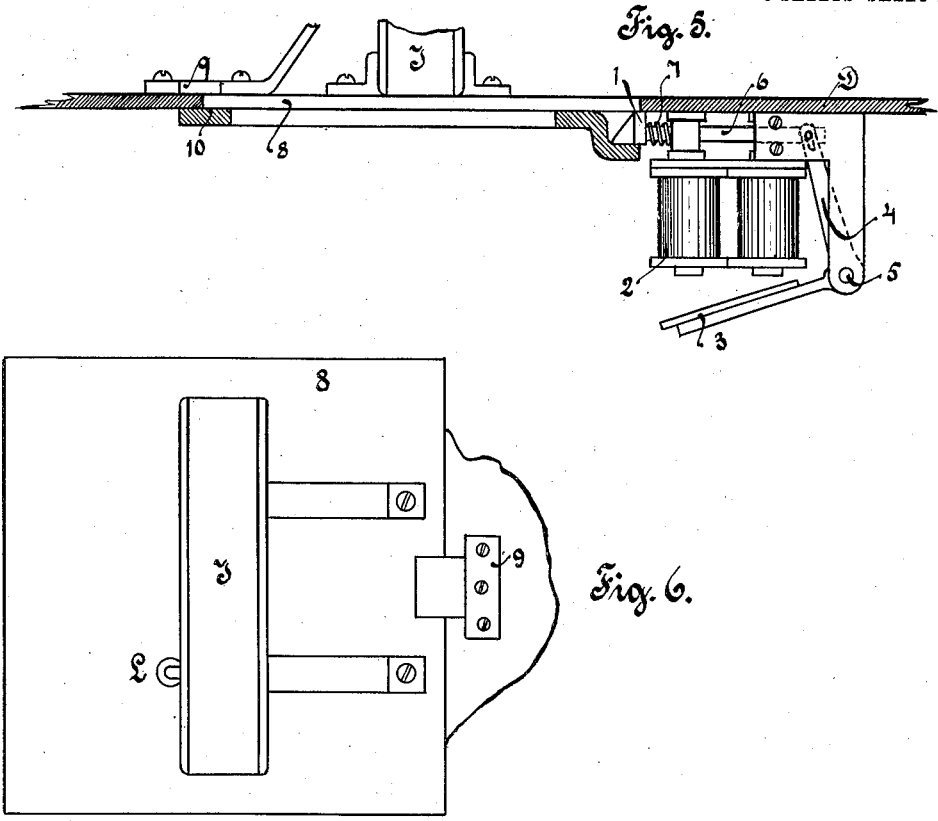
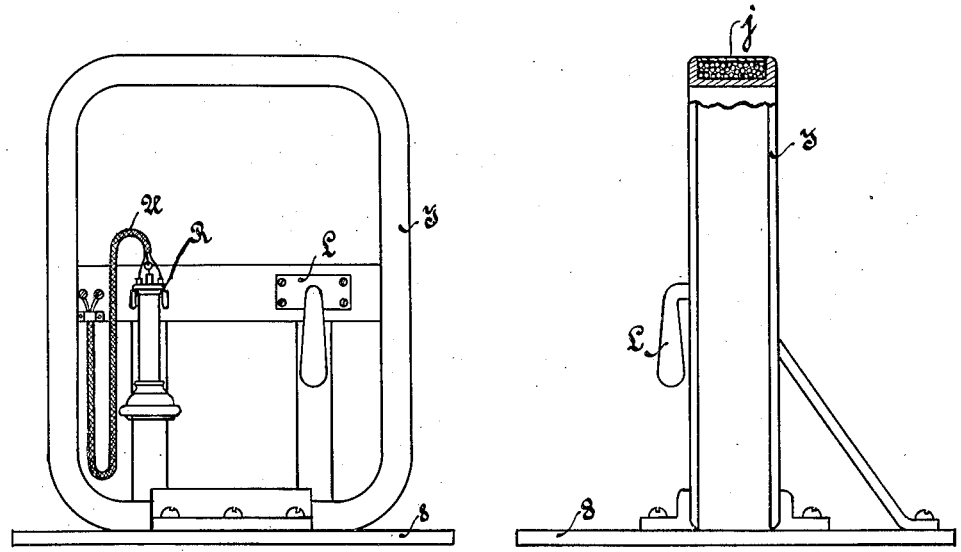

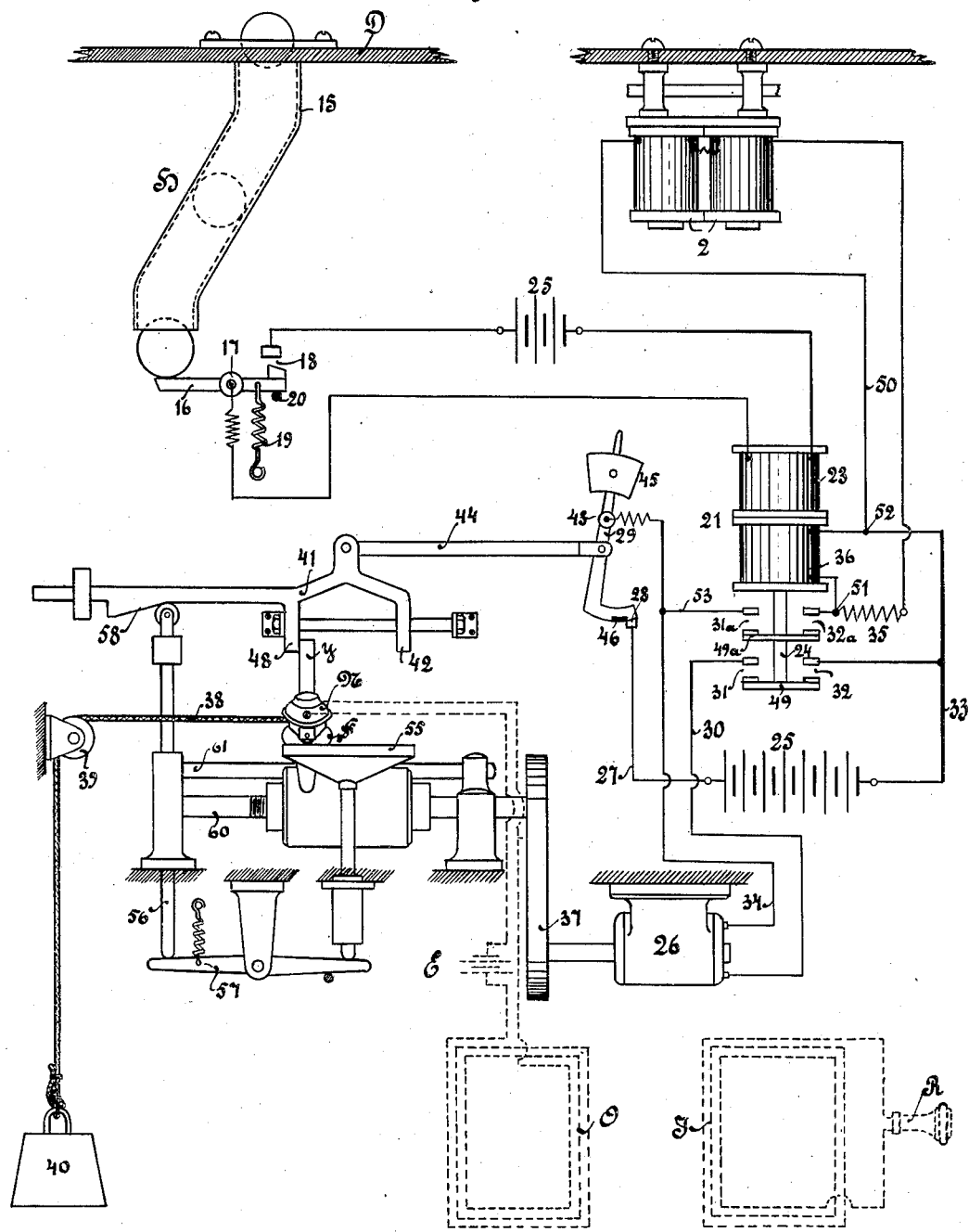

UNITED STATES PATENT OFFICE.

ARCHIE FREDERICK COLLINS, OF NEWARK, NEW JERSEY.

PHONOGRAPHIC WIRELESS TELEPHONE.

1,050,777.  Specification of Letters Patent.  Patented Jan. 14, 1913.

Application filed March 18, 1909. Serial No. 484,320.

*To all whom it may concern:*

Be it known that I, ARCHIE FREDERICK COLLINS, a citizen of the United States, residing at Newark, in the county of Essex and State of New Jersey, have invented new and useful Improvements in Phonographic Wireless Telephones, of which the following is a specification.

My invention relates to improvements in phonographic apparatus, in which a coin dropped in a slot sets in operation a phonograph provided with a record and having suitable ear pieces, so that one may hear a song or speech by the payment of a coin; and the objects of my improvements are, first to provide a new and novel form of amusement in such a slot phonograph; and second to construct a wireless telephone adapted for amusement purposes. I attain these objects by mechanism illustrated in the accompanying drawings, in which—

Figure 1, shows a front view of my phonograph slot machine with its telephonic apparatus. Fig. 2, shows a side view. Fig. 3, shows diagrammatically the principle upon which my invention is based. Figs. 4, 5, and 6, show details of construction, the latter figure including a plan view, a front view, and a side view of the removable coil and accessories forming part of the telephone. Fig. 7, shows in diagram the circuit of my invention.

Similar letters refer to similar parts throughout the several views.

Referring to Fig. 3, if A and B represent two coils of wire placed near together with their planes parallel and a telephone transmitter T with a battery E be connected in series with the coil A as shown, it is well known that on speaking into the transmitter, an undulatory current in rotation through the turns of wire will set up a magnetic flux, the lines of which may be great enough to link the coil B. A receiver R in circuit with coil B will be affected for, when the lines from the coil A thread through coil B an electromotive force proportional to the rate at which they link with B produces by its inductive action a momentary current in B. As the number of turns of wire and size of the coils and electromotive force increase, the distance between the two coils may be extended. I apply this action to a wireless telephone in connection with a phonographic slot machine.

In Fig. 1, I have shown a case or cabinet C in which is placed a phonograph P, operated by means of a motor 26 and battery 25. About the interior of the case C, I loop several turns of insulated wire, such as copper wire of about #20 B. & S. gage and insulated with a covering of cotton, silk or rubber. This may be wound in any suitable form, such as a flat coil O. This forms a coil O, corresponding to coil A of Fig. 3. The stylus S Fig. 4 of the phonograph is of the reproducing type and has mounted in juxtaposition a transmitter N, of the ordinary telephone type, the transmitter N together with a battery E, being connected in series with the coil O. It will thus be understood that when the phonograph is in operation the reproduced sounds will directly affect the diaphragm of the transmitter N, and thus produce an undulatory current in the coil O. A slot mechanism H of the usual sort, and shown in diagram Fig. 7, is provided for setting the phonograph in operation. This mechanism consists of a coin slot 15 fastened in any convenient place as on the shelf D, a contact lever 16 pivoted at 17 closes contact 18 when tilted by the weight of a coin, one end of said lever projecting into the path of the coin as it emerges from the slot, the coin rolling off at the closure of contact 18 and the lever being returned to its normal position by the spring 19 and stop 20. Contact 18 when closed energizes solenoid 21, by supplying current from battery 25 to its actuating winding 23. This gives a momentary draw-up of the plunger 24 and a consequent closing by the laminated bridges 49 and 49ª of its contacts 31, 32 and 31ª, 32ª to supply current from battery 25 to the motor 26 driving the phonograph and also to unlock the electro-magnetic latch of the movable frame 8 with its coil I and telephone. The path of current from the battery may be traced as follows, battery 25 lead 27, contact 28 of the gr.. ,ity throwover switch 29, lead 34, through the motor armature, lead 30, contacts 31, 32 by bridge 49, lead 33 to battery 25. A shunt is taken off the battery 25 as follows, lead 27, contact 28, switch 29, lead 53, contacts 31ª and 32ª by bridge 49ª, resistance 35, magnets 2, lead 50, lead 33 to battery. This energizes magnets 2, resistance 35 cutting down the current, and thus draws back the latch 1, Fig. 5 and holds it back until the release of plunger 24, i. e. until the lever 29 is tripped by the record on the cylinder running off. A shunt from points 51, 52 includes the locking winding 36 of solenoid 21. Thus solenoid 21 is locked up as long as contact 28 is closed.

The motor 26 is geared by suitable gearing 37 to the phonograph, and which is shown diagrammatically in essential elements in Figs. 4 and 7, which may be any well known type of machine. A stylus or reproducer S is made to travel over a record and to reproduce the speech or song of the record. Associated with the stylus S is the telephone transmitter N, Fig. 4, and the transmitter N is connected in circuit with the battery and coil as explained heretofore, shown in dotted line, Fig. 7. The arm Q carrying the stylus is moved along by the usual threaded shaft 60 having a nut 62, which engages this shaft, the arm being mounted to slide along shaft 61 on which it swings. Attached to the arm is a cord 38 running over the pulley 39, on the end of the cord is attached the weight 40.

A projecting lug X on the arm Q is arranged to be struck by a movable slideway 55, which is forced up by the plunger rod 56 and lever 57, the rod 56 being forced down by the cam surface 58, attached to the yoke 41 and which is moved over when the yoke is moved longitudinally by the lug Y on the stylus arm as hereinafter explained. Thus at the end of the record the throw over of weighted lever 29 will raise slideway 55 and thus lift the stylus S swinging the arm Q about 61 and raise the associate mechanism from the record and also the screw nut 62 will be lifted clear of its thread shaft. The arm Q will be returned to its initial position under the influence of the weight 40. Before the stylus is released, however, the stylus arm Q, which carries a stud Y, strikes the projection 42, Fig. 7 on the sliding yoke block 41 and throws lever 29, which is pivoted at 43 and connected with 41 by the link 44, the weight 45 on the lever throwing over the lever after it is passed beyond the vertical or dead-point. When lever 29 is thrown it will be observed that contact 28 is broken by means of the insulating block 46. This breaks the circuit of the motor, which will stop and the breaking of this circuit will also deënergize the solenoid 21 making further breaks in the circuit at the contacts 31 and 32, and 31ª and 32ª. The weight 40 when the stylus is released will carry the stylus back to its normal or resting position and in doing so will strike the lug 48 on the sliding yoke 41 and again throw lever 29, which thus closes contact 28, restoring the motor circuit to its normal or set position so that when the solenoid is operated again, the motor circuit is closed completely and the motor will start. The breaking of the circuit at points 31ª and 32ª will deënergize the locking magnets 2 of the electro-magnetic latch, thus releasing the latch 1, which under action of the spring will spring out and be ready to engage the bottom of the frame carrying the receiver and its associated apparatus, as hereinafter explained.

Upon the shelf D, of the cabinet and within easy reach of a person standing in front of the cabinet, is a light frame I, Fig. 5, made of wood and upon which is wound a coil of insulated wire similar to the coil O, having connected in series with it a telephone receiver R. The receiver being connected by flexible conductors U, so that it may readily be placed to the ear of the listener. The coil B corresponds to coil j. The frame I is provided with a handle L so that it may be lifted from the shelf D and carried about. A locking mechanism Fig. 5 is provided so that only after a coin has been inserted can the frame be lifted from the cabinet, since the coin is necessary to unlock the frame.

Referring to Fig. 5, the locking mechanism consists of electro-magnetic latch 1, and a retaining cleat 9. The latch 1 is arranged to be tripped by the electro-magnet 2, when it is energized by current upon the dropping of a coin in the slot. The circuit for this is shown in Fig. 7 and has already been explained. Sufficient to say that when the magnets are energized armature 3 draws up and swings the bell crank lever 4 on its pivot 5, lever 4 by means of a slot and pin connection engages sliding latch bar 6 and draws back the latch 1, a spring 7, on the deënergization of the magnets 2, causes latch 1 to normally maintain an outward or latching position as shown in the drawing. When the latch 1 is withdrawn, the frame 1 may be readily lifted out of the cabinet, since its base 8 may be disengaged from the retaining cleat 9, after the unlatching of 1, and tilting of the frame so as to raise it out of the recess 10 into which it sets. It will thus be seen that upon the insertion of the coin, the phonograph is put in operation and the telephone R with its frame may be lifted from the cabinet and if the plane of the coil J is kept parallel with the plane of coil O, the reproduced sounds in the transmitter N will be inductively reproduced in the receiver R and the person holding the receiver R to his ear will hear those sounds and their loudness may be increased or diminished according to whether he approaches or recedes from the cabinet since he always carries the coil J in his hand. After the phonograph has run down, the patron would return the frame I to the shelf D setting it into the recess 10 or special place provided therefor so that it would automatically lock itself and the phonograph would also automatically set itself as heretofore described prepared for the next patron, who would have to put another coin in the slot to unlock the frame and start the machine.

It will thus be seen that I have provided a novel form of amusement since by my invention one may hear without the use of wires, between the phonograph-telephone transmitter and the receiving instrument held by the user, a song or a speech reproduced at some distance off.

I am well aware that my particular wireless telephone is not new or novel and also that a simple phonographic mechanism is not new, but What I do claim is—

1. A phonographic slot machine comprising a cabinet, a phonograph mounted therein, a telephone transmitter and circuit operated by said phonograph, a stationary sending coil connected to said transmitter circuit and mounted within said cabinet, and a portable secondary coil and telephone receiver also mounted within said cabinet but having means for rendering said secondary coil and telephone receiver releasable therefrom whenever said phonograph is operated.

2. The combination of a cabinet, a phonograph mounted therein, a telephone transmitter and circuit operated by said phonograph, a stationary sending coil connected to said transmitter circuit, a portable secondary coil and telephone receiver removably mounted within said cabinet, a latch for securing said portable secondary set, and means operated by the control mechanism of said phonograph for releasing said latch.

3. The combination of a cabinet, a phonograph mounted therein, a telephone transmitter and circuit operated by said phonograph, a sending coil connected to said transmitter circuit, a portable secondary coil and telephone receiver releasably secured to said cabinet, means for operating said phonograph, and means controllable simultaneously with said operating means for releasing said portable secondary coil and telephone receiver.

4. The combination of a cabinet, a phonograph mounted therein, a telephone transmitter and circuit operated by said phonograph, a sending coil connected to said transmitter circuit, a portable secondary coil and telephone receiver releasably secured to said cabinet, an electric motor for operating said phonograph, and common means for starting said electric motor and releasing said portable secondary coil and telephone receiver.

5. The combination of a cabinet, a phonograph mounted therein, a telephone transmitter and circuit operated by said phonograph, a sending coil connected to said transmitter circuit, a portable secondary coil and telephone receiver releasably secured to said cabinet, an electro-magnet for releasing said secondary coil and telephone receiver, an electric motor for operating said phonograph, and a switching device for simultaneously controlling the circuits of said electric motor and said electro-magnet.

6. The combination of a cabinet, a phonograph mounted therein, a telephone transmitter and circuit operated by said phonograph, a sending coil connected to said transmitter circuit, a portable secondary coil and telephone receiver releasably secured to said cabinet, an electro-magnet for releasing said secondary coil and telephone receiver, an electric motor for operating said phonograph, an electro-magnetic switching device for simultaneously controlling the circuits of said electric motor and said electro-magnet, and a master circuit for operating said electro-magnetic switching device.

7. The combination of a cabinet, a phonograph mounted therein, a telephone transmitter and circuit operated by said phonograph, a stationary sending coil connected to said transmitter circuit, a portable secondary coil and telephone receiver removably mounted within said cabinet, a latch for securing said portable secondary set, an electro-magnet for operating said latch, an electric motor for operating said phonograph, and common means for controlling said electro-magnet and electric motor.

ARCHIE FREDERICK COLLINS.

Witnesses:
    FREDERICK A. WATKINS,
    WM. J. WHITE.